V. J. WAHLSTROM.
TAPPING OR DRILLING ATTACHMENT.
APPLICATION FILED JULY 14, 1909.
968,718.
Patented Aug. 30, 1910.
2 SHEETS—SHEET 1.
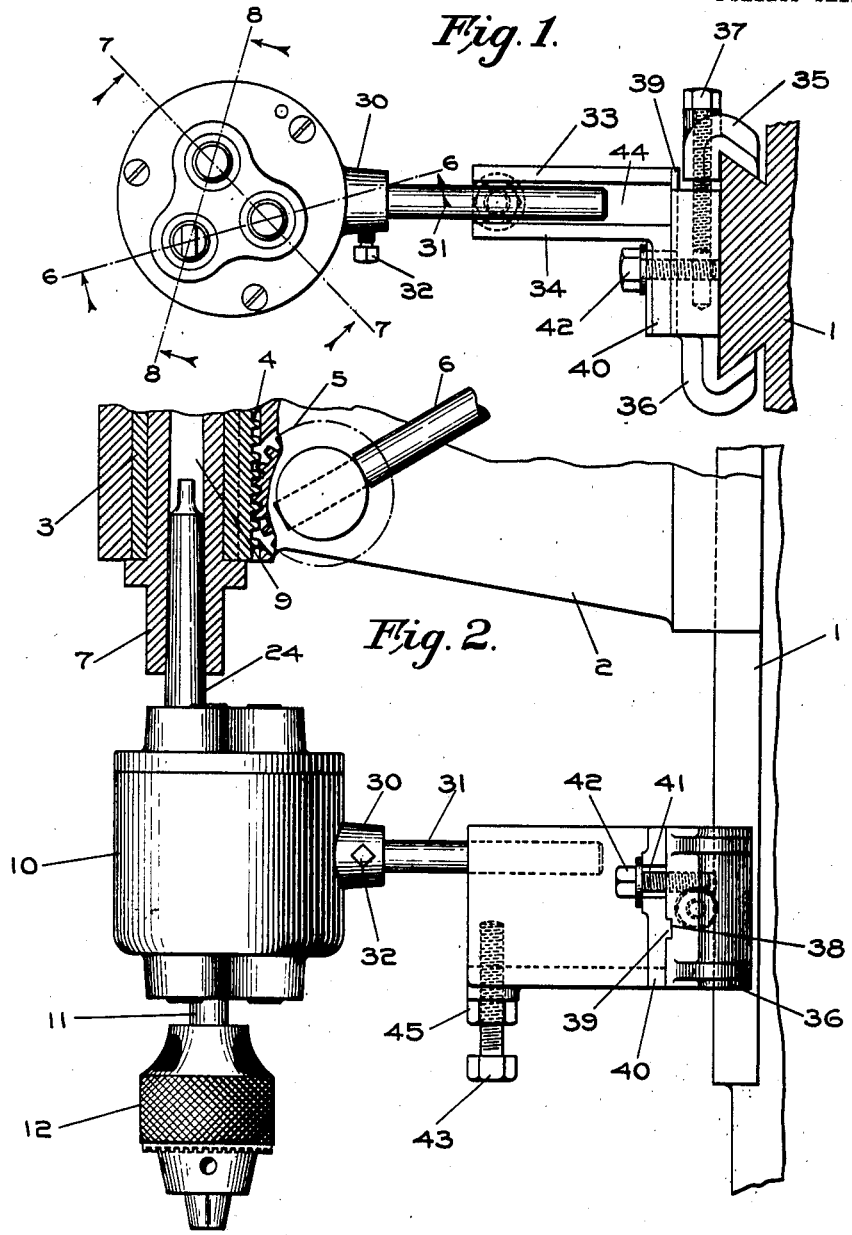
Attest.
A. White
P. N. Tilden.
Inventor.
Verner J. Wahlstrom
by Philipp, Sawyer, Rice & Kennedy
attys V. J. WAHLSTROM.
TAPPING OR DRILLING ATTACHMENT.
APPLICATION FILED JULY 14, 1909.

968,718.

Patented Aug. 30, 1910.
2 SHEETS—SHEET 2.

Attest
A. White
P. N. Tilden.

Inventor
Verner J. Wahlstrom
by Philipp, Sawyer, Rice & Kennedy
Atty's

UNITED STATES PATENT OFFICE.

VERNER J. WAHLSTROM, OF BROOKLYN, NEW YORK, ASSIGNOR OF ONE-HALF TO BERNARD T. BURCHARDI, OF BROOKLYN, NEW YORK.

TAPPING OR DRILLING ATTACHMENT.

968,718.  Specification of Letters Patent.  Patented Aug. 30, 1910.

Application filed July 14, 1909. Serial No. 507,524.

*To all whom it may concern:*

Be it known that I, VERNER J. WAHLSTROM, a citizen of the United States, residing at Brooklyn, county of Kings, and State of New York, have invented certain new and useful Improvements in Tapping or Drilling Attachments, fully described and represented in the following specification and the accompanying drawings, forming a part of the same.

This invention relates to certain improvements in tapping or drilling attachments.

The invention has for one of its objects to produce an improved construction of tapping or drilling attachment whereby the chuck head may be prevented from rotation both when the attachment is moving toward and moving away from the work.

A further object of the invention is to produce an improved tapping or drilling attachment in which a guide is employed by which the chuck head is prevented from rotation both when the head is moved toward and away from the work and in which an adjustable stop is provided for determining the amount of travel of the drill attachment toward the work.

A further object of the invention is to produce an improved tapping or drilling attachment in which means are provided for giving the tap a slow movement while it is moved toward the work or during the tapping operation, and a rapid movement while it is being moved away from the work.

With these and other objects not specifically referred to in view, the invention consists in certain constructions, and in certain parts, improvements and combinations as will be hereinafter fully described and then specifically pointed out.

Figure 3:
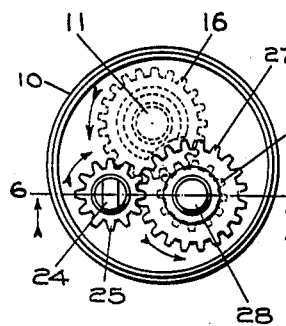
Figure 4:
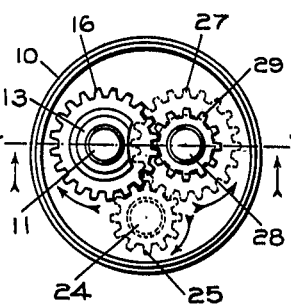
Figure 5:
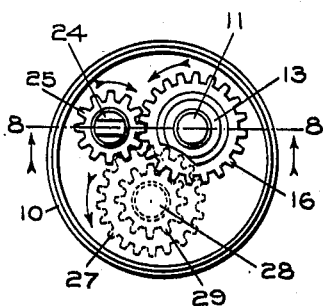
Figure 6:
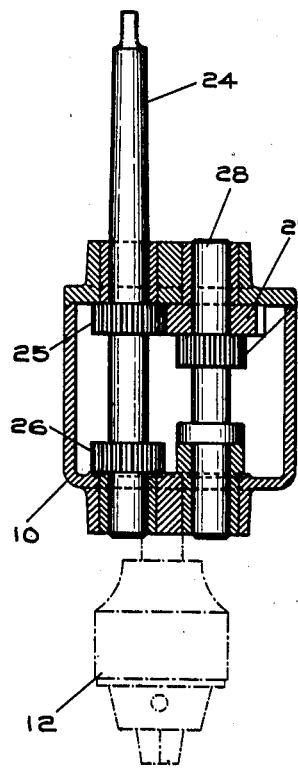
Figure 7:
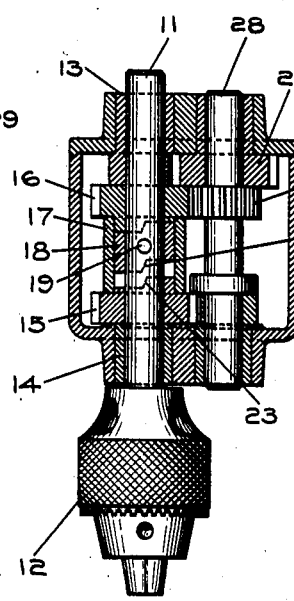
Figure 8:
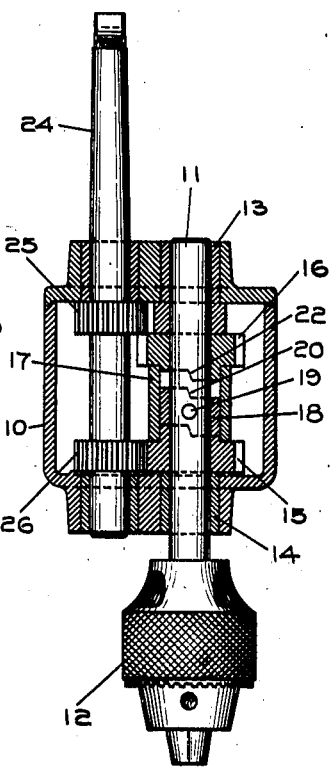

Referring to the accompanying drawings—Figure 1 is a plan view of the improved attachment, the column of the drill press being shown in section. Fig. 2 is a side elevation of the construction shown in Fig. 1, certain parts of the drill press being shown in section. Figs. 3, 4 and 5 are plan views of the chuck driving head with the cover removed, certain of the gears, however, in each view, being shown in dotted lines, in the interest of clearness, and the position of the chuck head being shifted somewhat in each view. Fig. 6 is a section on the line 6—6 of Figs. 1 and 3. Fig. 7 is a section on the line 7—7 of Figs. 1 and 4. Fig. 8 is a section on the line 8—8 of Figs. 1 and 5.

Referring to said drawings, which illustrate one embodiment of the invention, 1 indicates the column of the ordinary drill press and 2 a part of the spindle arm. The sleeve surrounding the spindle is indicated at 3, this sleeve being provided with the usual rack 4 which is engaged by a pinion 5, which is operated by a handle 6 to force the sleeve down. The spindle, indicated at 7, is provided with a socket 9 with which the driving shaft of the attachment is engaged. The construction shown is the usual one in drill presses and may be of any approved type.

In the particular construction illustrated, the attachment includes a head as 10, in which the chuck spindle 11 is mounted, this spindle being provided with a chuck 12 of any approved construction. As illustrated, the spindle is mounted in an upper bearing 13 and a lower bearing 14. The spindle is arranged to be driven in opposite directions, according as it is desired to move the tap toward or away from the work. As shown, this is effected by providing a lower gear, as 15, through the hub of which the spindle passes, this gear resting on the bearing 14, and an upper gear, as 16, this gear resting on a sleeve 17 which in turn rests on the gear 15, the gear 16 being prevented from upward movement by a hub formed on the bearing 13. The spindle has fast to it a clutch collar, as 18, this collar being secured in position by a pin 19 or in any other suitable manner. This collar is formed with an upper clutch face, as 20, and a lower clutch face, as 21, the hub of the gear 16 being provided with a clutch face 22 which coöperates with the clutch face 20, and the hub of the gear 15 is provided with a clutch face 23 which coöperates with the clutch face 21.

It is apparent that if the spindle 11 be moved upward the clutch collar which is fast to it will move with it and its upper clutch face 20 will become engaged with the clutch face 22 on the gear 16, so that this gear may drive the spindle. Also, if the spindle be moved downward the clutch face 21 on the collar 18 will become engaged with the clutch face 23 on the gear 15, so that this gear may drive the spindle.

The means by which the gears referred to are driven may be varied. In the particular construction shown, the attachment is provided with a driving shaft 24 mounted in the chuck-head, this shaft being provided with gears 25, 26. The gear 26 is in mesh with the gear 15 before referred to. The gear 25 is in mesh with a gear 27 mounted on an intermediate shaft 28 supported in the chuck-head, this shaft being also provided with a pinion 29 which meshes with the gear 16. It is apparent that when the clutch spindle is in such position that its clutch collar is locked to the gear 15, the spindle will be rotated in one direction, and when it is in such position that its clutch collar is locked to the gear 16, the spindle will be rotated in the opposite direction.

In the construction illustrated, the gears 25, 27, 29 and 16 are so proportioned that when they are rotating the spindle, it will move at a lesser speed than when the gears 26 and 15 are rotating the spindle. It is further apparent that the four gears referred to rotate the spindle while the tap is moving into the work, and that when the tap is being withdrawn from the work, the gears 26 and 15 are in engagement, the construction providing, therefore, for a more rapid movement of the tap when it is being withdrawn from the work than when it is moving into the work.

The best constructions embodying the invention will be provided with a guide by which the chuck head may be prevented from rotation not only while the tap is moving toward the work but also when it is moving away from it. While the construction of this guide may be varied, in the particular mechanism illustrated, the tapping head is provided with a socket 30 in which there is secured a guide member comprising a finger or projection 31, this projection being held in place by a screw 32, or in any other suitable manner. The end of this finger engages between side pieces 33, 34 of a coöperating guide member which may be conveniently formed, as shown, of a single casting.

The member which coöperates with the guide member on the tapping head, whatever be its construction, will be provided with means for securing it to the drill press. In the particular construction illustrated, this means includes a two-part clamp 35, 36, the two parts being held together by a screw 37. This clamp is arranged to engage, as illustrated, the sides of the drill press column. In the best constructions embodying the invention, this coöperating guide member will be mounted so that its position may be adjusted with respect to the member on the tapping attachment. While this may be accomplished in various ways, in the particular construction illustrated, the member 36 of the two-part clamp is provided with a guideway 38 which is engaged by a projection 39 on a piece 40 on guide member 33, 34, this piece being further slotted, as indicated at 41, the slot being engaged by a screw 42 tapped into the piece 36. In this construction, it is apparent that the guide member 33, 34 may be slid in one direction or the other so as to position it properly with respect to the projection 31. The best constructions will further include an adjustable stop for limiting the amount of movement of the attachment toward the work. While this stop may be constructed in various ways, in the particular construction illustrated, there is provided a screw 43 tapped through a web 44 which connects the parts 33, 34. This screw may, as shown, be provided with a lock nut 45 to hold it in position. It will be apparent that as the projection 31 descends, it will strike the end of the stop screw 43 sooner or later, according to the adjustment of the screw and that the screw will prevent the further movement of the attachment toward the work. It will also be apparent that when the descent of the head is thus stopped the tap, as it rotates, will draw the shaft 11 downward, thus releasing the clutch collar on the spindle from the collar on the gear 16, so that the movement of the tap is automatically stopped.

Such changes and variations may be made in the construction by which the invention is carried into effect as fall within the scope of the appended claims. The invention is not, therefore, to be confined to the specific constructions hereinbefore described and illustrated in the accompanying drawings.

What is claimed is:—

1. In a tapping or drilling attachment, the combination with a chuck-head, of a horizontally adjustable guide operating to prevent the chuck-head from rotating both when the attachment is moving toward and when it is moving away from the work.

2. In a tapping or drilling attachment, the combination with a chuck-head, of a horizontally adjustable guide operating to prevent the chuck-head from rotating both when the attachment is moving toward and when it is moving away from the work, and an adjustable stop coöperating with the guide.

3. In a tapping or drilling attachment, the combination with a chuck-head, of a guide member mounted thereon, a second relatively stationary guide member with which said first member coöperates, and means for detachably connecting said second member to the drill press column.

4. In a tapping or drilling attachment, the combination with a chuck head, of a guide member mounted thereon, a second relatively stationary guide member having side pieces between which the first member operates, and means for detachably connecting the second member to the drill press column.

5. In a tapping or drilling attachment, the combination with a chuck-head, of a guide member mounted thereon, a second guide member, a clamp for securing said second member to the drill press column, and connections between the second guide member and the clamp.

6. In a tapping or drilling attachment, the combination with a chuck-head, of a guide member mounted thereon, a second guide member, a clamp for securing said second member to the drill press column, and adjustable connections between the second guide member and the clamp.

7. In a tapping or drilling attachment, the combination with a chuck-head, of a guide member mounted thereon, a second guide member, a clamp for securing said second member to the drill press column, connections between the second guide member and the clamp, and an adjustable stop mounted on one of the guide members.

8. In a tapping or drilling attachment, the combination with a chuck-head, of a guide member mounted thereon, a second guide member, a clamp for securing said second member to the drill press column, adjustable connections between the second guide member and the clamp, and an adjustable stop mounted on one of the guide members.

9. In a tapping or drilling attachment, the combination with a clamp, of a channeled guide member, a slide forming a part of said member, guiding connections between the slide and the clamp, means for locking the slide in a predetermined position, a chuck-head, and a guiding projection carried by the chuck-head engaging the channeled guide.

10. In a tapping or drilling attachment, the combination with a chuck-head, of a guide comprising a projection on the chuck-head, a channeled guide in which said projection moves, means for adjustably connecting the channeled guide to the drill press column, and an adjustable stop carried by one of said guides.

11. In a tapping or drilling attachment, the combination with a chuck head, of a chuck spindle mounted therein, upper and lower gears supported in the head through the hubs of which said spindle is movable, a clutch collar fast on the spindle, coöperating clutch collars on the gear hubs, a driving shaft, a gear thereon in mesh with one of the chuck spindle gears, an intermediate shaft mounted in the chuck head, a gear thereon in mesh with the other chuck spindle gear, and gearing between said intermediate shaft and the driving shaft.

12. In a tapping or drilling attachment, the combination with a chuck head, of a chuck spindle mounted therein, upper and lower gears supported in the head through the hubs of which said spindle is movable, a clutch collar fast on the spindle, coöperating clutch collars on the gear hubs, a driving shaft, a gear thereon in mesh with one of the chuck spindle gears, an intermediate shaft mounted in the chuck head, a gear thereon in mesh with the other chuck spindle gear, gearing between said intermediate shaft and the driving shaft, and adjustable means for limiting the advancing movement of the spindle and thereby disengaging its clutch collar from the clutch collar of its driving gear.

In testimony whereof, I have hereunto set my hand, in the presence of two subscribing witnesses.

VERNER J. WAHLSTROM.

Witnesses:
A. WHITE,
P. N. TILDEN.